Sept. 15, 1936.　　　H. J. LEITSCH　　　2,054,506
SOLDERING IRON
Filed Dec. 17, 1935　　　2 Sheets-Sheet 1
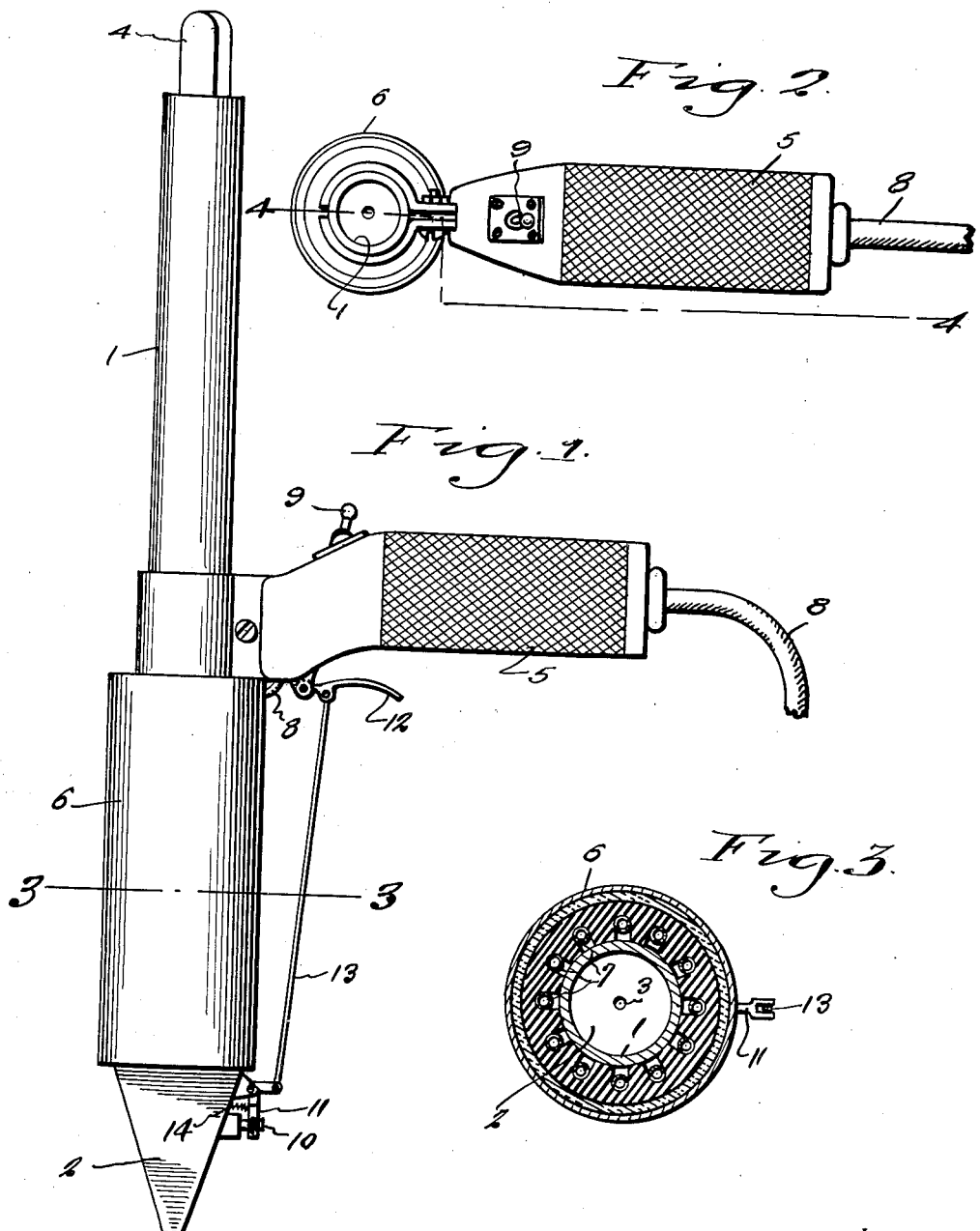
Inventor
Henry J. Leitsch
By Clarence A. O'Brien and
Hyman Berman
Attorneys

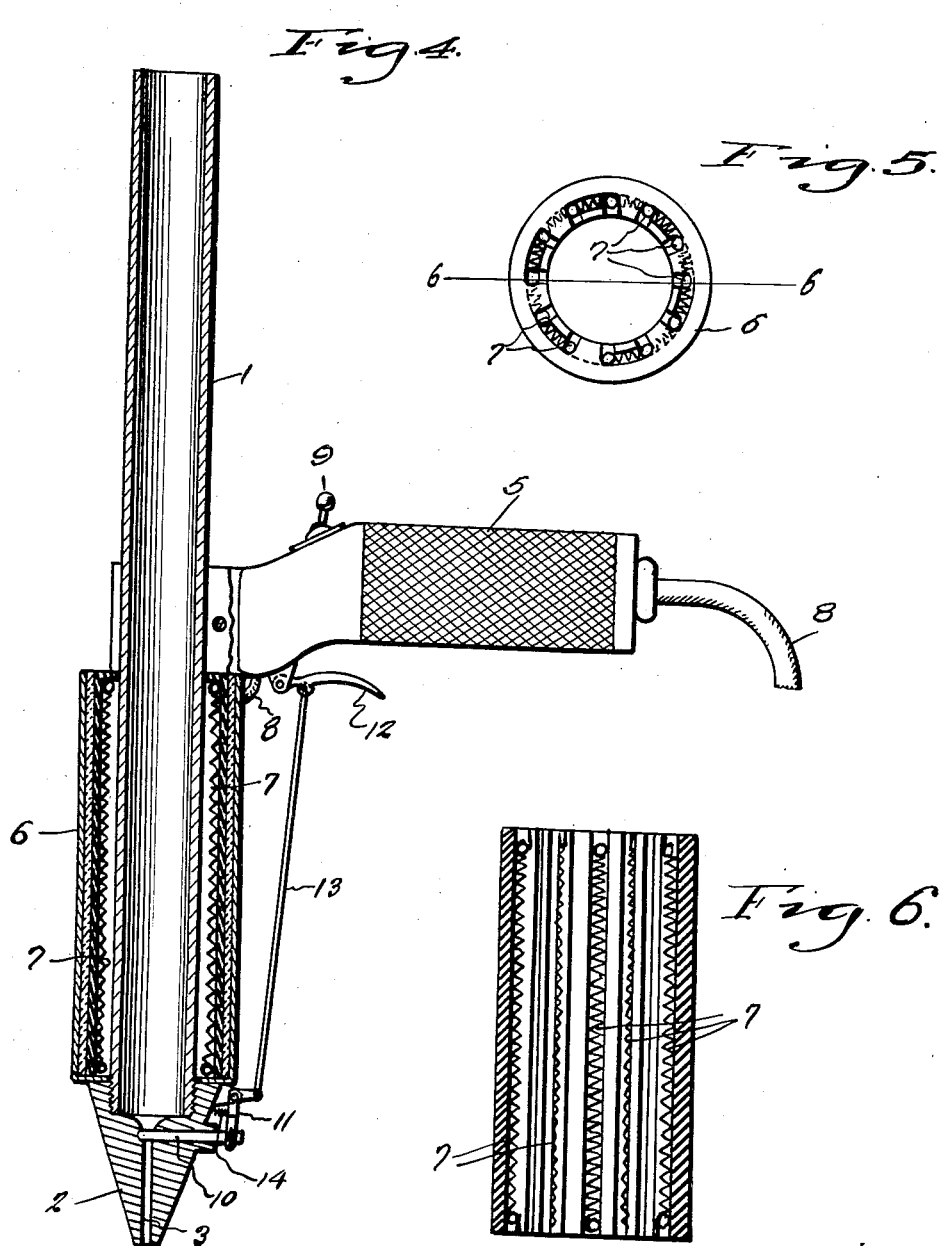

Patented Sept. 15, 1936

2,054,506

UNITED STATES PATENT OFFICE 2,054,506

SOLDERING IRON

Henry Joseph Leitsch, Hamilton, Ohio

Application December 17, 1935, Serial No. 54,919

1 Claim. (Cl. 219—27)

The present invention relates to new and useful improvements in soldering irons and has for its primary object to provide, in a manner as hereinafter set forth, a tool of this character embodying a novel construction through the medium of which the solder may be rapidly heated and melted by electricity.

Another very important object of the invention is to provide an electric soldering iron which will be well balanced, thus facilitating the use of the device.

Other objects of the invention are to provide a soldering iron of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of an electric soldering iron constructed in accordance with the present invention.

Figure 2 is a top plan view of the invention.

Figure 3 is a cross-sectional view, taken substantially on the line 3—3 of Figure 1.

Figure 4 is a vertical sectional view, taken substantially on the line 4—4 of Figure 2.

Figure 5 is a detail view in end elevation of the electric heating unit.

Figure 6 is a vertical sectional view, taken substantially on the line 6—6 of Figure 5.

Referring now to the drawings in detail, it will be seen that the embodiment of the invention which has been illustrated comprises a tubular magazine 1 of suitable metal having threadedly mounted on one end portion a substantially pyramidal tip 2 having a bore 3 therein communicating with said magazine 1. At its other end, the tubular magazine 1 is open for the reception of bars of solder, as at 4.

Secured at an intermediate point on the magazine 1 is a handle 5. The reference numeral 6 designates a substantially cylindrical casing which is mounted on the magazine 1 between the tip 2 and the handle 5. The casing 6 encloses a plurality of insulated electric heating elements 7 through the medium of which the solder in the magazine 1 is, of course, heated. The conductor wires 8 for the heating elements 7 pass through the handle 5 and mounted on said handle 5 is a control switch 9.

The bore 3 of the tip 2 is controlled by a valve 10 which is slidably mounted in said tip 2. A bell crank lever 11 is pivotally mounted on the tip 2 and operatively connected, at one end, to the valve 10 through a pin and slot connection or the like. Pivotally mounted on the handle 5 is a trigger 12 which is operatively connected to the bell crank lever 11 through a rod 13. A spring 14 which is connected to the bell crank lever 11 normally closes the valve 10.

It is thought that the operation of the invention will be readily apparent from a consideration of the foregoing. Solder is placed in the magazine 1 through the open end thereof and, of course, extends into the end portion of said magazine which is enclosed by the casing 6. The switch 9 is then closed for energizing the heating elements 7, thus heating and melting the solder in the magazine 1. Then, by actuating the trigger 12, the valve 10 may be opened against the tension of the coil spring 14 for permitting the solder to flow through the bore 3 of the tip 2. Of course, when the trigger 12 is released the spring 14 immediately closes the valve 10. By mounting the handle 5 on the magazine 1 at an intermediate point a substantially well balanced tool is had.

It is believed that the many advantages of an electric soldering iron constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A soldering iron of the character described comprising, in combination, a substantially tubular magazine, a tip mounted on one end portion of the magazine, said tip having a bore therein communicating with the magazine, said magazine being open at its other end for the reception of solder, a substantially pistol grip handle, a clamp carried thereby for removably securing the handle to the magazine at an intermediate point, a substantially cylindrical casing encircling the magazine between the tip and the handle and removably mounted on the magazine and retained in position adjacent the tip by the clamp, electric heating elements for the magazine in the casing, a valve slidably mounted in the tip for controlling the bore, a bell crank lever pivotally mounted on the tip and operatively connected to the valve, a trigger pivotally mounted on the handle, and a rod operatively connecting the bell crank lever to said trigger for actuation thereby.

HENRY JOSEPH LEITSCH.